Dec. 1, 1959　　　　　J. W. DAVIS　　　　　2,915,147
DISC BRAKE FOR VEHICLES
Filed Nov. 1, 1955　　　　　　　　　　　　12 Sheets-Sheet 1

INVENTOR
JOHN WALTER DAVIS
by Walter S. Heston
ATTORNEY

Dec. 1, 1959  J. W. DAVIS  2,915,147
DISC BRAKE FOR VEHICLES
Filed Nov. 1, 1955  12 Sheets-Sheet 2
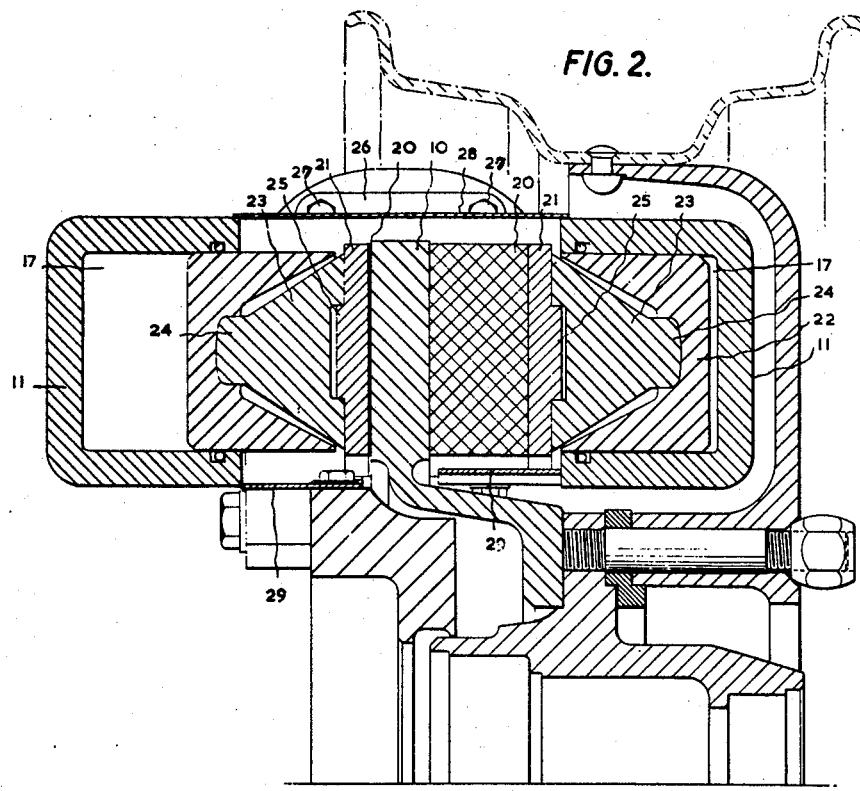
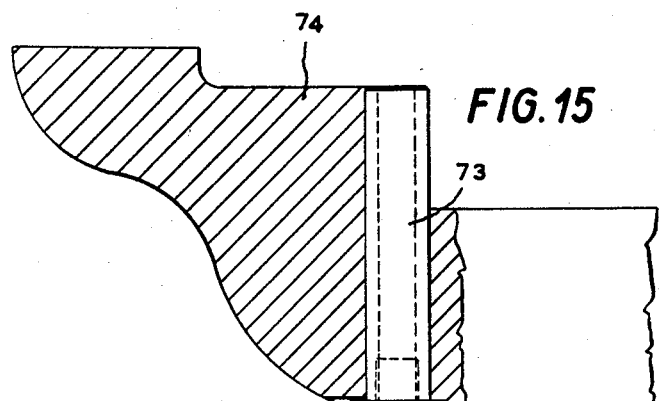
INVENTOR
JOHN WALTER DAVIS
by Walter S. Pleston
ATTORNEY

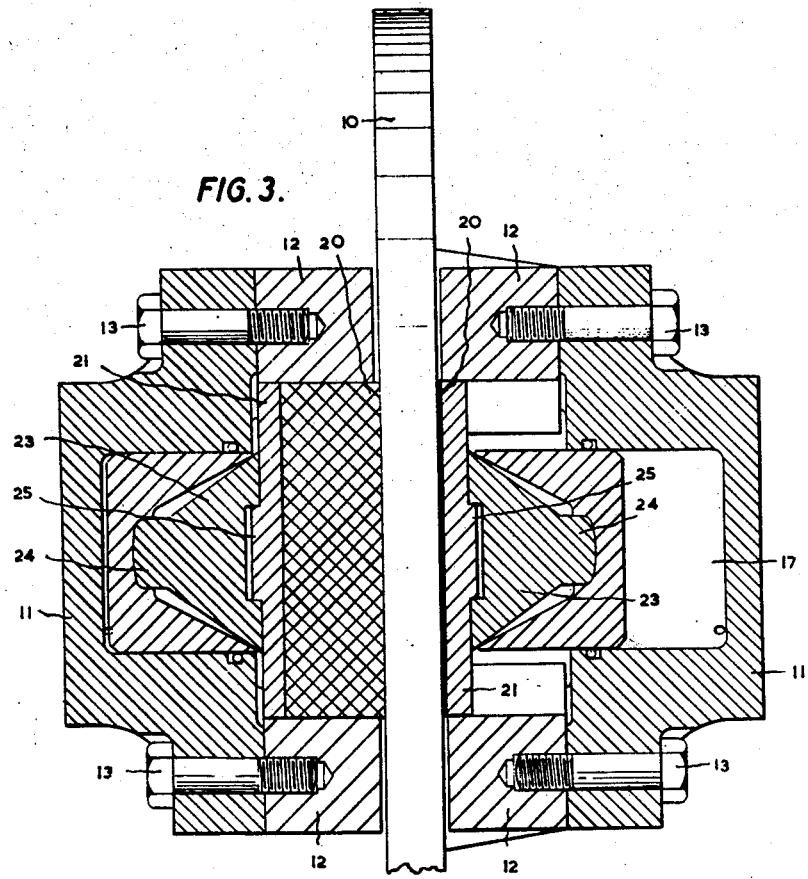

Dec. 1, 1959　　　　　J. W. DAVIS　　　　2,915,147
DISC BRAKE FOR VEHICLES
Filed Nov. 1, 1955　　　　　　　　　　12 Sheets-Sheet 5
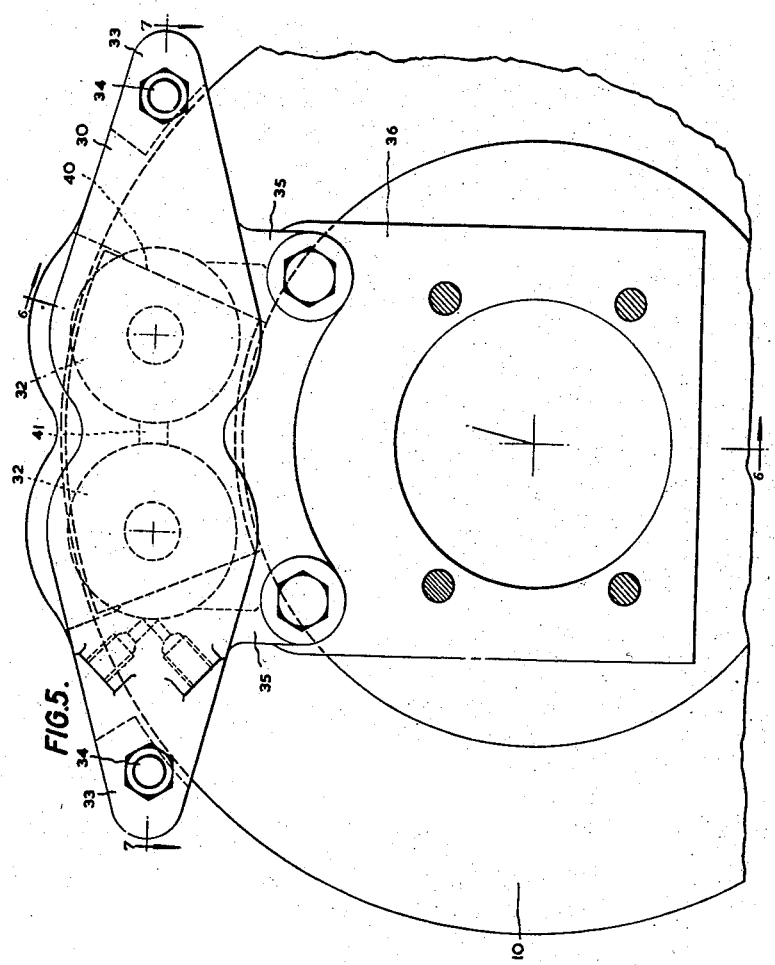
INVENTOR:
John Walter Davis
by Walter S. Pleston
ATTORNEY

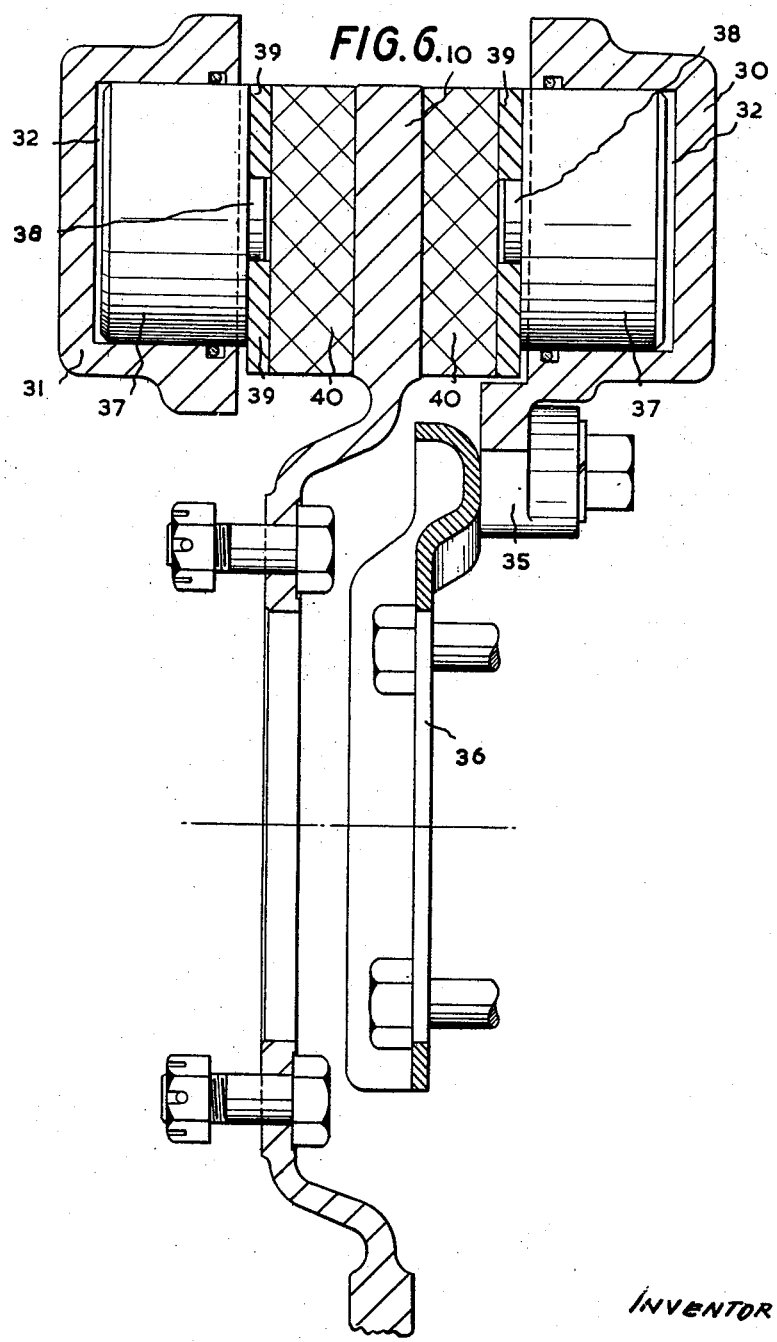

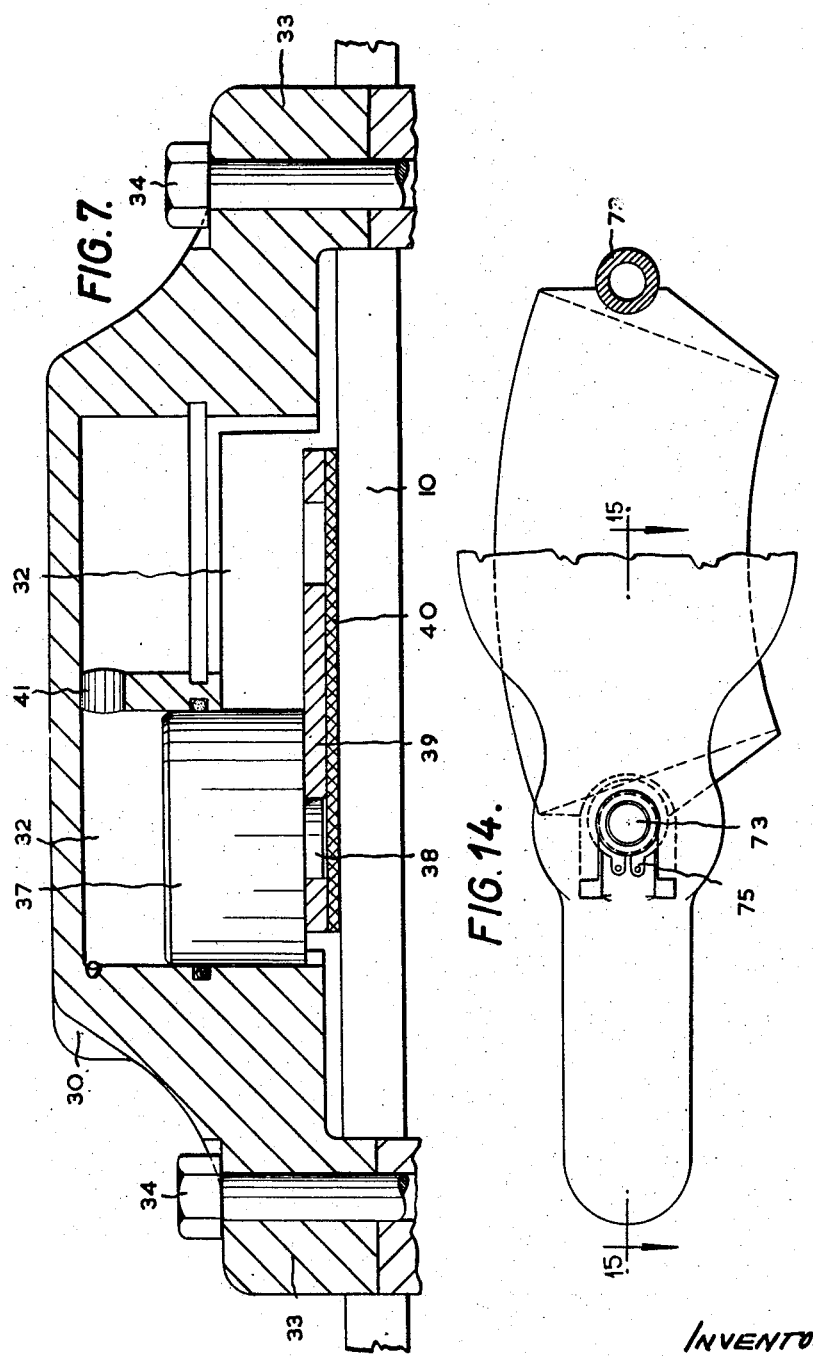

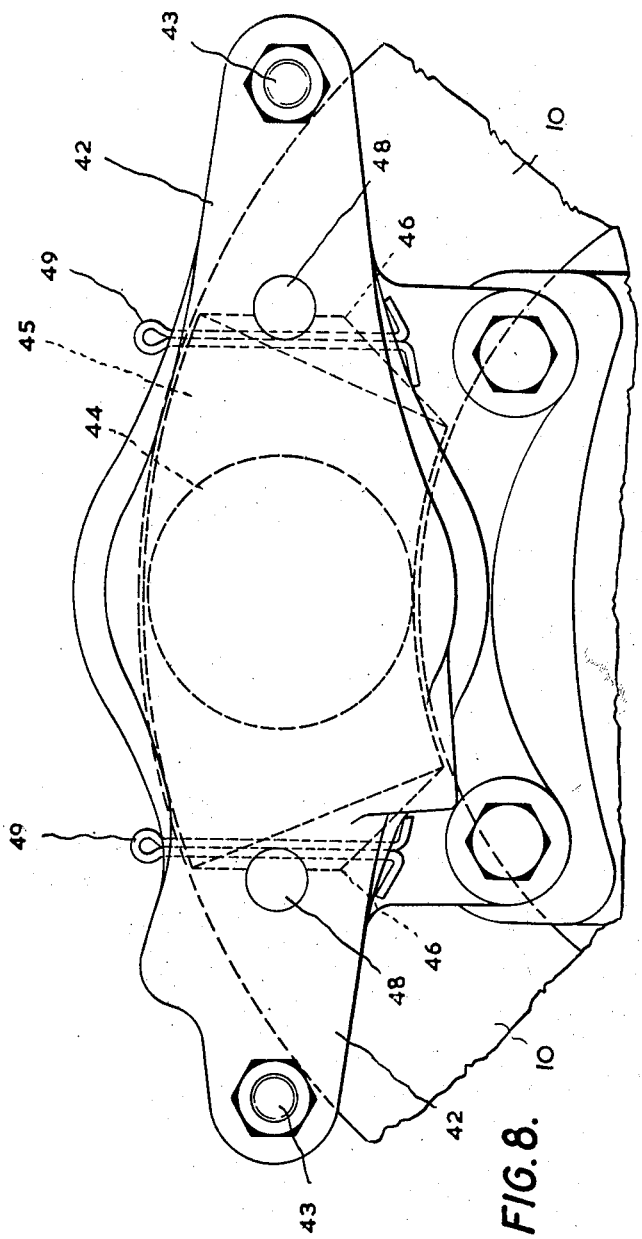

Dec. 1, 1959   J. W. DAVIS   2,915,147
DISC BRAKE FOR VEHICLES
Filed Nov. 1, 1955   12 Sheets-Sheet 9
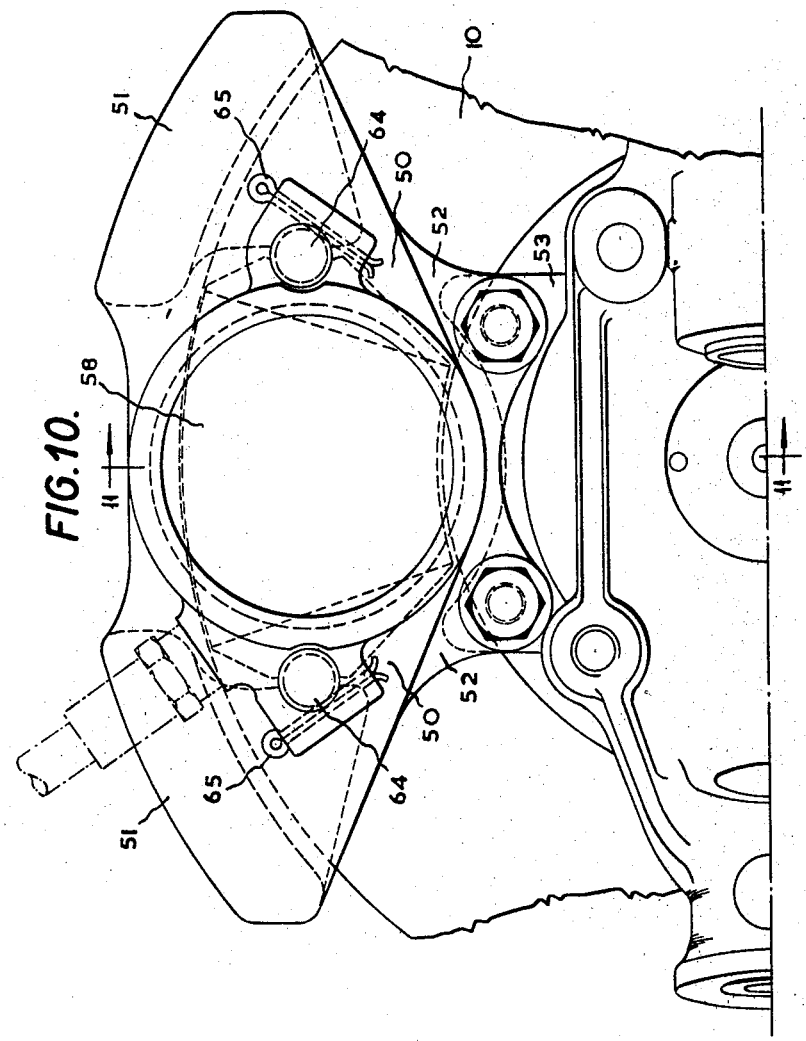
INVENTOR
JOHN WALTER DAVIS
by Walter S. Pleston
ATTORNEY Dec. 1, 1959 J. W. DAVIS 2,915,147
DISC BRAKE FOR VEHICLES
Filed Nov. 1, 1955 12 Sheets-Sheet 12

INVENTOR
JOHN WALTER DAVIS
by Walter S. Olenton
ATTORNEY

United States Patent Office 2,915,147
Patented Dec. 1, 1959

2,915,147

DISC BRAKE FOR VEHICLES

John Walter Davis, Rubery, Rednal, Birmingham, England, assignor to Girling Limited, Birmingham, England, a British company Application November 1, 1955, Serial No. 544,338

11 Claims. (Cl. 188—73)

This invention relates to disc brakes for vehicles of the type in which friction pads are adapted to be urged into engagement with opposite faces of a disc rotating with a wheel or other rotating member, the friction pads being applied by hydraulic means in a housing which straddles a portion of the periphery of the disc and in which the friction pads are mounted.

According to the invention, in a disc brake of that type the friction pads are of segmental outline and the radially outermost side of the housing is open over a sufficient circumferential length to permit the insertion and removal of a pad through the opening.

This feature greatly facilitates service and maintenance of the brake and permits the friction pads to be inspected at any time to see the extent to which they have worn and whether they should be replaced.

The open outer side of the housing may be closed by a light readily removable cover to prevent the entry of water and dust.

The housing conveniently comprises two complementary members located on opposite sides of the brake disc and rigidly connected at their ends by circumferentially spaced members which straddle or lie outside the periphery of the disc. The connecting members may be integral with the housing members or they may be bolts passing through end portions of the housing members which extend beyond the periphery of the disc. Alternatively the connecting members may be angularly spaced stirrups which straddle the brake disc and to which the ends of the housing members are secured.

Abutments for the ends of a segmental pad to take the torque on the pads when the brake is applied may be formed by the stirrups, or lugs or shoulders may be provided on the housing members for that purpose. Alternatively, the torque may be taken by the engagement of the pistons in the hydraulic cylinders with the cylinder walls, each friction pad being bonded to a steel backing plate having an opening or openings to receive spigots on the pistons.

In a preferred arrangement each friction pad is bonded to a steel backing plate of which the ends extend beyond the ends of the pad, and notches are provided in the end edges of the plate to co-operate with torque-taking pins or pegs of which the axes are parallel to the axis of the disc and which are removably mounted in the housing. These pins not only take the torque on the pads when the brake is applied but they locate the pads against any movement in a radial direction while allowing the pads to move freely towards and away from the disc.

The main part of the torque on a friction pad is taken by one or other of the pins according to the direction of rotation of the brake disc, the second pin taking any part of the torque tending to cause angular movement of the friction pad and backing plate about the first pin. The pins are removed when it is necessary to withdraw a friction pad for inspection or replacement.

Some practical forms of disc brake in accordance with the invention are illustrated by way of example in the accompanying drawings, in which:

Figure 2 is a section on the line 2—2 of Figure 1 in a radial plane containing the axis of the brake cylinders.

Figure 3 is a section on the line 3—3 of Figure 1.

Figure 5 is an end elevation of another form of brake.

Figure 6 is a section on the radial line 6—6 of Figure 5.

Figure 7 is a section on the line 7—7 of Figure 5.

Figure 8 is an end elevation of a further form of brake.

Figure 10 is an end view of another form of brake.

Figures 14 and 15 are fragmentary views showing one method of mounting detachable locating pins for the brake pads.

Figure 1:
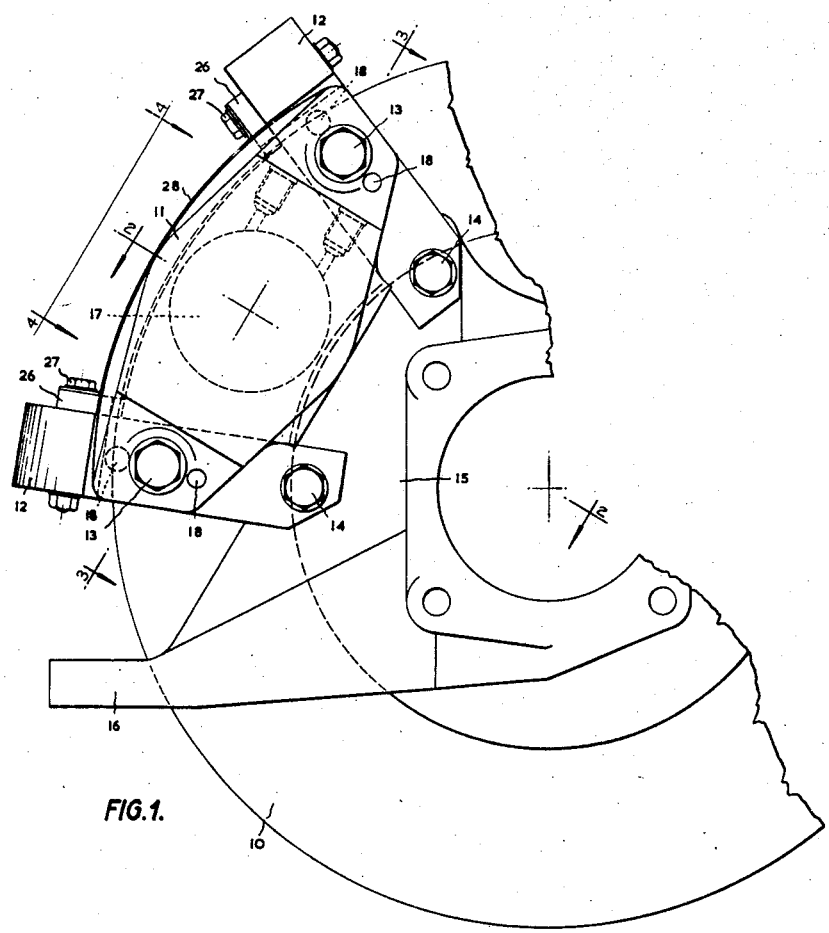
Figure 1 is an end elevation of one form of brake.

In the brake shown in Figures 1 to 4, 10 is the brake disc which is mounted to rotate with a vehicle wheel. The brake housing is built up from two complementary blocks 11 located on opposite sides of the brake disc and two angularly spaced forged steel stirrups 12 which straddle the periphery of the disc and to which the ends of the blocks are rigidly secured by bolts 13. Each stirrup is of U outline with parallel limbs which are substantially radial with respect to the axis of the brake disc and are spaced apart at a distance slightly greater than the axial thickness of the disc. The limbs of the stirrups on one side of the disc are extended inwardly and are drilled to receive bolts 14 by which they are secured to a stationary torque-taking member 15. In a front-wheel brake the member 15 may be integral with a steering arm 16.

The central part of each block is of sufficient thickness in a direction parallel to the axis of the disc to house a cylinder bore 17 closed at its outer end.

The ends of the block are stepped down in thickness and are located by dowel pins 18 as well as by the bolts 13 which secure them to the stirrups.

Each friction pad 20 is segmental in outline and is of such dimensions as to fit between the inner faces of the limbs of the stirrups and to be entered between the inner face of a block and the adjacent surface of the disc. The pads are preferably bonded to steel backing plates 21 which are of the same outline as the pads and in the arrangement illustrated the ends of the pads and backing plates abut on the stirrups, as shown more particularly in Figure 3, which take the torque on the pads when the brake is applied. In an alternative arrangement lubs or shoulders may be provided on the blocks 11 for that purpose.

The backing plate of each pad may be engaged directly by a piston 22 working in the corresponding cylinder bore 17 but preferably there is interposed between the backing plate and the piston a thrust member 23 of roughly conical form which is received in a frusto-conical recess in the forward end of the piston. At its narrow outer end the thrust member has an axially extending spigot portion 24 with a rounded end which is received in a complementary extension of the inner end of the recess. The backing plate has a short spigot portion 25 which is received in a recess in the forward end of the thrust member.

The combined axial length of the piston and thrust member in relation to the axial length of the cylinder is such that when they are fully retracted, as shown on the right side of Figure 2 and the left side of Figure 3, a friction pad with its backing plate can be inserted between the brake disc and the inner face of the block from the radially outermost face of the housing. When the pad is worn down, as shown on the left side of Figure 2 and the right side of Figure 3, it can be removed and a new pad substituted in the same way.

Radially outward movement of the friction pads under braking or other forces is prevented by stop members 26 which are secured to the inner faces of the stirrups 12 by bolts 27.

These bolts preferably also serve to retain a curved sheet metal cover 28 which closes the outer side of the housing between the stirrups and is removable with the stop members 26 to give access to the friction pads for inspection or replacement.

Sheet metal baffles 29 may be fixed to the housing on the inner side as shown in Figure 2 to arrest water and mud thrown outwardly from the central part of the brake disc.

Any convenient means are provided for connecting the outer ends of the cylinder bores to each other and to a master cylinder for applying the brake.

In the brake illustrated in Figures 5, 6 and 7, the housing is formed by two complementary members 30, 31, of substantial length which lie on opposite sides of the disc and are at right angles to a radius of the disc passing through the centre of the length of the housing. Each member is a forging or casting having a central part of substantial axial thickness in which are formed two parallel blind cylinder bores 32, 32 and two end portions 33, 33 of less thickness which are stepped or extend in an axial direction beyond the inner face of the central part to meet the complementary end portions of the other member in the central plane of the brake disc 10 as shown in Figure 7. These end portions of the members lie outside the periphery of the brake disc and are rigidly secured together by bolts 34 of which the axes are parallel to the axis of the disc. The axes of the bolts 34 and of the cylinder bores conveniently lie in a single plane which is at right angles to a radius of the disc, as shown in Figure 5, so that the forces urging the two members of the housing apart when the brake is applied are taken as pure bending moments on the members which can readily be designed to resist there forces without appreciable distortion.

The member 30 has on its inner edge spaced lugs 35 which are secured by bolts to a stationary part 36 of the vehicle adjacent to the brake disc to take the torque on the housing when the brake is applied.

A piston 37 of substantial axial length works in each cylinder bore 32, and on the end of each piston next to the brake disc is an axial spigot 38 entering an opening in a steel backing plate 39 to which the friction pad 40 is bonded. The friction pad and backing plate are of segmental outline. The spigots locate the pad against displacement with the brake disc when the brake is applied and permit the torque on the pad to be taken by the engagement of one or other piston with the outer side of the wall of its cylinder according to the direction of rotation of the disc.

The pistons advance towards the disc as the friction pads wear, and the outer walls of the cylinders, that is the portions of the cylinder walls adjacent to each end of the assembly, are extended towards the surface of the disc and terminate close to that surface, as shown in Figure 7, to provide adequate bearing surfaces for the pistons to take the torque when the thickness of the friction pads has become relatively small.

Figure 7 shows one piston in the position it assumes when the friction pad has worn to such an extent that it is due for replacement, the other piston being omitted to show the outline of the inner face of the housing member.

Each friction pad has the form of a segment of a ring of a radial width equal to or slightly greater than the diameter of the cylinder bores, as shown in dotted lines in Figure 5, so that the effective area of the pad is substantially greater than the combined cross-sectional area of the cylinder bores.

When the friction pads have worn down to a minimum thickness the worn pads with their steel backing plates can be readily disengaged from the spigots on the pistons and withdrawn through the open outer face of the housing and new pads and backing plates can be substituted.

The closed outer ends of the cylinder bores in each member are connected by a passage 41, and the bores in the two members are connected to each other and to a master cylinder or the like by external piping so that equal pressures are applied to all the brake cylinders when the piston in the master cylinder is actuated.

In the modified construction shown in Figure 8 the brake housing is again formed by two complementary members 42 secured together at their ends by bolts 43 which lie outside the periphery of the brake disc 10.

Figure 9:
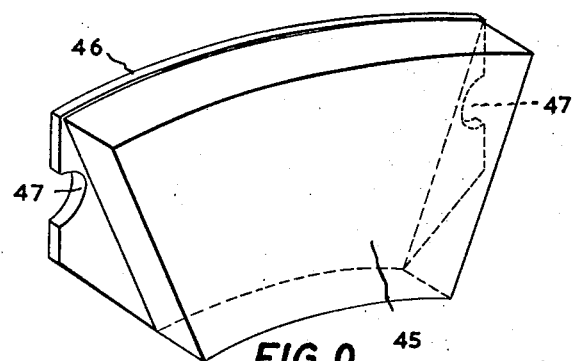
Figure 9 is a perspective view of one of the brake pads and its backing plate employed in the brake shown in Figure 8.
Figure 4:
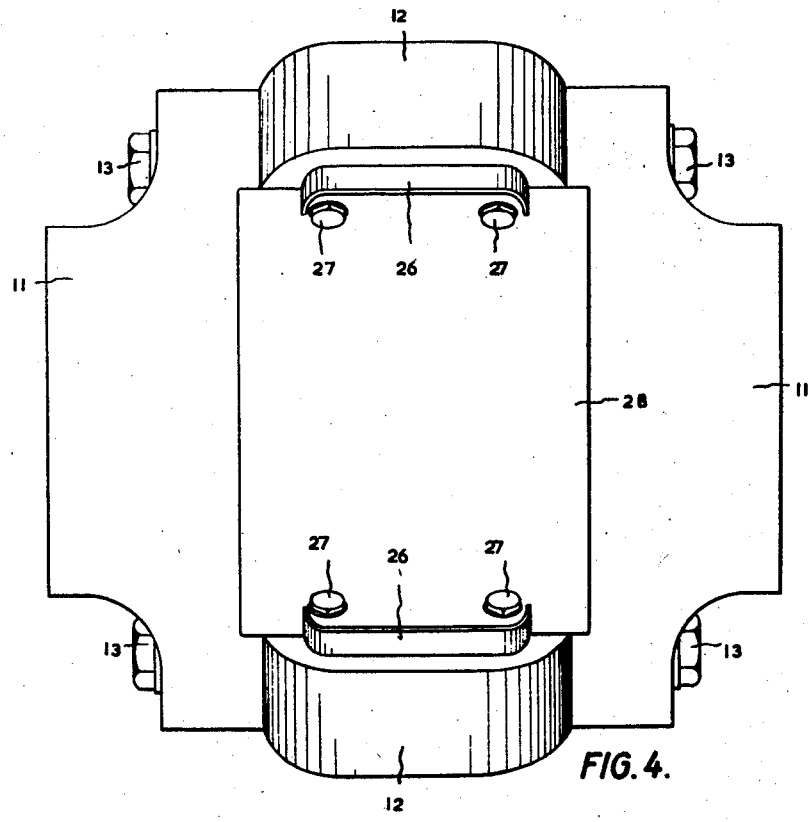
Figure 4 is an external view of the outer surface of the brake housing looking in the direction of the arrows 4, 4 of Figure 1.

There is a single hydraulic cylinder 44 in each member for actuating a friction pad 45 of segmental outline. The pad is bonded to a steel backing plate 46 of the form shown in Figure 9. The plate extends at each end beyond the pad and a part-circular recess 47 is formed in each end edge of the plate to co-operate with a removable pin or peg 48 mounted in the housing member 42 with its axis parallel to the axis of the brake disc. The pins are held in place by split-pins 49 engaging in grooves in the pins so that the pins 48 can be readily removed to permit the friction pads with their backing plates to be taken out through the open outer face of the housing when worn. Fresh pads are then inserted and the pins 48 are replaced.

When the brake is applied the torque on the friction pads is taken through the backing plates by the pins 48. The major part of the torque on each pad will be taken by one or other of the pins according to the direction of rotation of the wheel, the second pin taking any part of the torque tending to cause angular movement of the pad and backing plate about the first pin. It will be appreciated that in addition to the torque-taking function the pins 48 locate the friction pads against any movement in a radial direction while allowing them to move freely towards and away from the disc.

Figure 11:
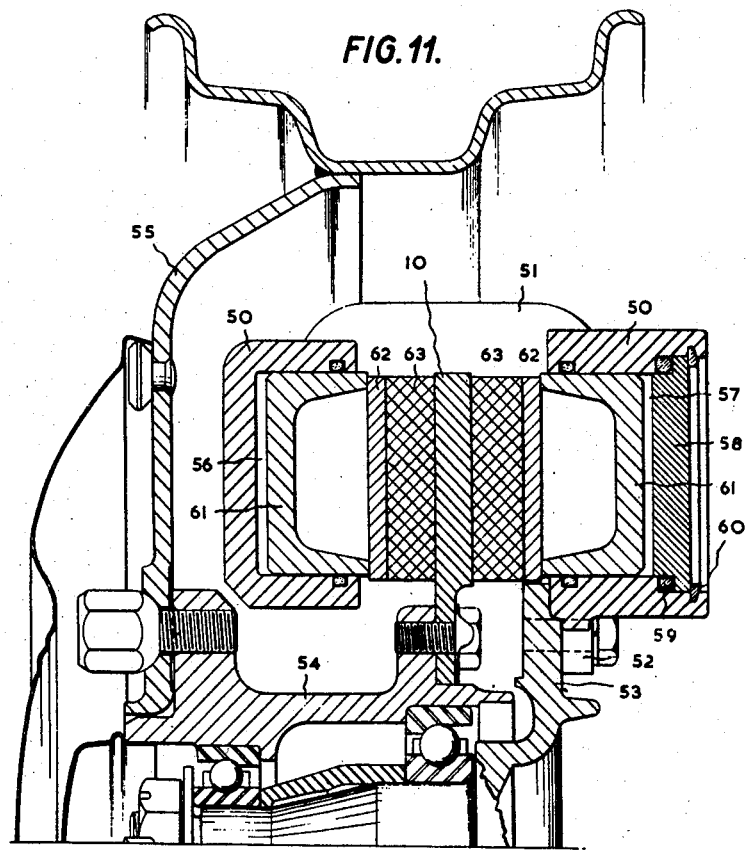
Figure 11 is a section on the radial line 11—11 of Figure 10.

In the construction shown in Figures 10 and 11 the housing is a one-piece forging or casting and comprises two block portions 50 of roughly triangular outline with integral connecting portions 51 lying outside the periphery of the brake disc 10, the portions 51 being spaced apart in a circumferential direction at a sufficient distance to permit the insertion and removal of the friction pads from the outer side of the housing. One of the block portions 50 is provided on its inner edge with inwardly projecting lugs 52 to receive bolts by means of which the housing is mounted on a stationary member 53 adjacent to a rotatable hub 54 which carries the brake disc 10 and a wheel 55. Aligned cylinder bores 56, 57 are formed in the block portions 50. The bore 56 is a blind bore closed at its outer end, but the bore 57 extends through the block to permit the bores to be machined. The outer end of the bore 57 is closed by a disc 58 which is sealed by O ring 59 and retained by a spring ring 60 located in an annular groove in the enlarged outer end of the bore.

Pistons 61 working in the bores engage directly with backing plates 62 to which the segmental friction pads 63 are bonded. The backing plates are of substantially the same outline as those shown in Figure 9 and semicircular recesses in their end edges co-operate with torque-taking pins 64 which are removably mounted in the housing and are retained by split-pins 65.

Figure 12:
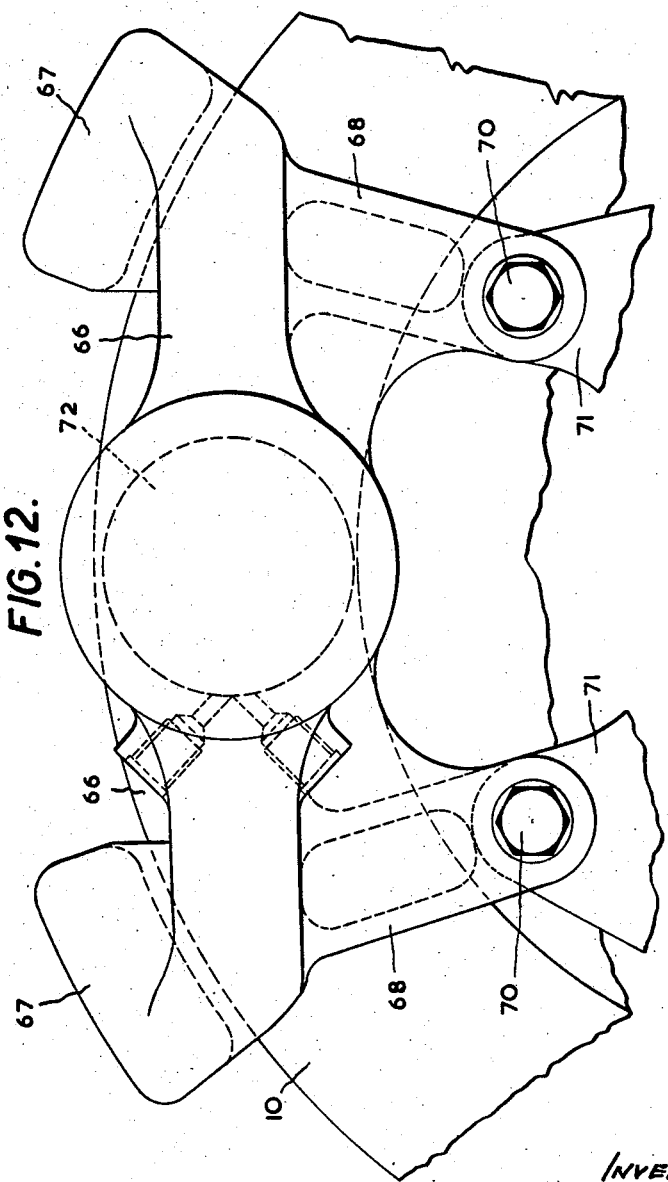
Figure 12 is an end elevation of an alternative form of brake housing.
Figure 13:
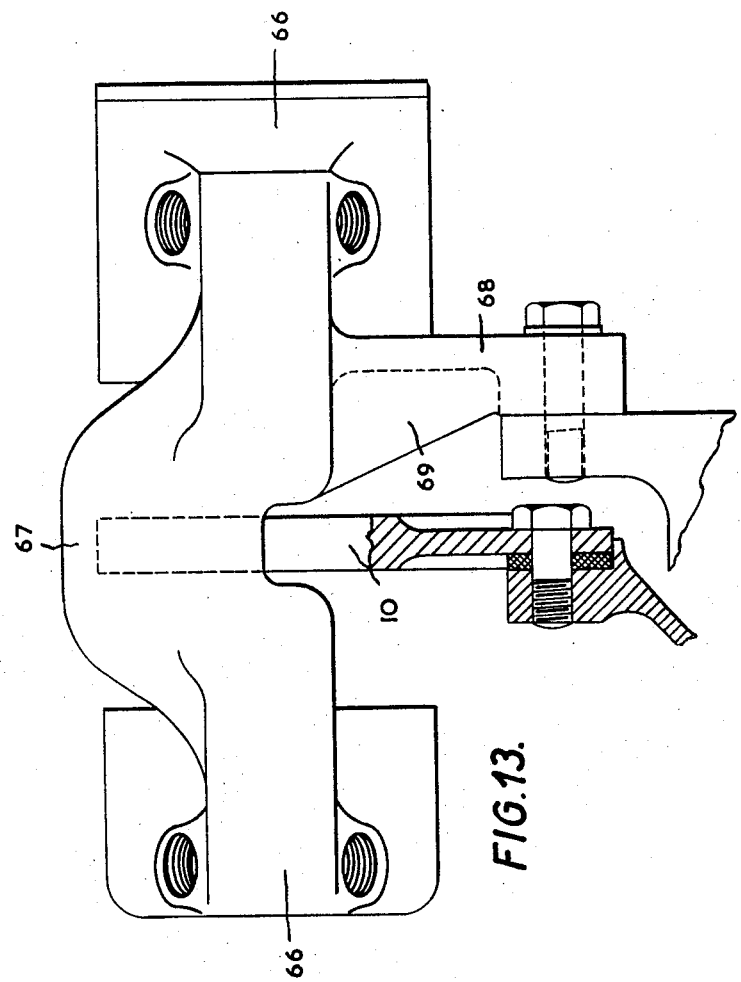
Figure 13 is a side elevation of the housing shown in Figure 12.

Figures 12 and 13 show an alternative form of one-piece housing. This housing is a forging or casting and comprises two rigid bar portions 66 lying on opposite sides of the brake disc 10 and connected at their ends by integral transverse portions 67 lying outside the periphery of the disc. Integral lugs 68 reinforced by webs 69 extend inwardly from one side of the housing to receive bolts 70 for securing the housing to a stationary torque-taking member 71.

The central part of each bar portion 66 is enlarged at its centre to accommodate a cylinder bore 72 for applying a segmental friction pad.

Figures 14 and 15 show a convenient method of mounting in a housing a removable torque-taking pin such as the pins 48 and 64 referred to above. The pin 73 is inserted into a bore which is drilled in the housing in such a position that the inner end of the pin which is engaged by the backing plate of the friction pad is rigidly backed by a portion 74 of the housing. The pin is retained in position by a circlip 75 engaging in an annular groove in the pin and a complementary groove in the housing.

I claim:

1. A disc brake comprising a rotatable disc, a stationary housing straddling a portion of the outer periphery of the disc, opposed friction pads in said housing, hydraulic means adapted to urge said friction pads into engagement with opposite faces of said disc, said hydraulic means including opposed cylinders in rigid connection with said housing, and locating means for said pads releasably secured to said housing and adapted to prevent movement of said pads in a direction other than parallel to the axis of said disc, said housing being provided with an opening over a part of its outer periphery whereby on removal of at least part of said locating means said pads can be removed radially outwards through said opening, whereby said hydraulic means remain undisturbed in said housing on insertion or removal of said pads.

2. A disc brake as in claim 1, said opening of said housing extending over a circumferential length not less than the maximum circumferential length of the friction pads and over a width in an axial direction not less than the combined axial thickness of the brake disc and friction pads, the cylinder rims adjacent said disc being spaced from said disc so as to permit the passing of the pads therebetween and the insertion and removal of the pads through said opening of the housing upon the removal of at least part of the locating means.

3. A disc brake as in claim 1 wherein said housing comprises two complementary members of substantial length located on opposite sides of the brake disc and at right angles to a radius of the disc passing through the centre of the length of the housing, and bolts rigidly connecting the adjacent ends of said members and lying outside the periphery of the disc.

4. A disc brake as in claim 1 wherein said housing is a one-piece steel member comprising two complementary block portions lying on opposite sides of the brake disc and integral end portions lying outside the periphery of the disc and rigidly connecting the blocks.

5. A disc brake as in claim 1 wherein apertures are provided in said backing plates, further comprising spigots on said pistons engaging in said apertures for transferring to the walls of the hydraulic cylinders through the pistons the torque on the friction pads when the brake is applied.

6. A disc brake as in claim 1, said locating means including removable pins in said housing engaging with the backing plate of a friction disc for taking the torque on the friction pad when the brake is applied.

7. A disc brake as in claim 6 wherein said removable pins are cylindrical members mounted in the housing with their axes parallel to the axis of the brake disc and part-cylindrical notches are formed in the edges of the backing plate of the friction pad for engagement with said pins for locating said friction pad against radial movement.

8. A disc brake as in claim 7 wherein said removable pins are backed by rigid portions of the housing at the points where they are engaged by said backing plate.

9. A disc brake for vehicles comprising a rotatable brake disc, a stationary housing straddling a portion of the outer periphery of the disc, opposed hydraulic cylinders in said housing, friction pads mounted in said housing for engagement with opposite faces of said disc, steel backing plates to which said friction pads are bonded, pistons working in said hydraulic cylinders for urging said friction pads into engagement with the braking disc, intermediate thrust members interposed between said pistons and said backing plates, and locating means for said pads releasably secured to said housing so as to prevent movement of the pads in a radial direction but permitting their movement in a direction parallel to the disc axis, the radially outermost side of said housing being open over a circumferential length not less than the maximum circumferential length of the friction pads and backing plates which can be inserted and removed through said open side, after the removal of said locating means.

10. A disc brake comprising a rotatable disc, a stationary housing straddling a portion of the outer periphery of the disc and including complementary members located on opposite sides of the brake disc and rigid stirrups straddling the disc and secured to the ends of said members, opposed friction pads in said members, respectively, hydraulic means adapted to urge said friction pads into engagement with opposite faces of said disc, the inner faces of said stirrups forming torque-taking abutments for the friction pads, and locating means for said pads releasably secured to said housing, said housing being open over its outer periphery between said stirrups whereby on removal of said locating means, said pads can be removed radially outward through the opening of said housing.

11. A disc brake comprising a single rotatable brake disc, a stationary housing straddling a portion of the outer periphery of the disc and comprising complementary members located on and spaced from opposite sides of the disc and circumferentially spaced portions rigidly connecting said complementary members outside of the disc periphery, opposed friction pads mounted in said housing, means guiding the pads towards and away from the disc, opposed hydraulic cylinders in said complementary members and rigidly connected thereto, pistons working in said cylinders for urging the friction pads into engagement with opposite faces of said brake disc, and means releasably secured to said housing to prevent a shifting of said pads in the radial direction, the housing being open in the peripheral direction between said circumferentially spaced portions and across the disc periphery between said members, said pads being insertable and removable through said opening of said housing after the removal of said releasable means.

References Cited in the file of this patent

UNITED STATES PATENTS

| | | |
|---|---|---|
| 1,527,798 | Hawley | Feb. 24, 1925 |
| 2,174,396 | McCune | Sept. 26, 1939 |
| 2,687,786 | Kelley | Aug. 31, 1954 |
| 2,754,936 | Butler | July 17, 1956 |
| 2,762,460 | Butler | Sept. 11, 1956 |
| 2,799,367 | Dotto | July 16, 1957 |

FOREIGN PATENTS

| | | |
|---|---|---|
| 1,089,618 | France | Mar. 21, 1955 |
| 706,050 | Great Britain | Mar. 24, 1954 |
| 709,305 | Great Britain | May 19, 1954 |